United States Patent
Babbini (10) Patent No.: US 7,461,591 B2
(45) Date of Patent: Dec. 9, 2008

(54) SCREW PRESS FOR SQUEEZING OUT FIBROUS MATERIAL

(75) Inventor: Lionello Morando Babbini, Galeata (IT)

(73) Assignee: New Pressing Technology Di Babbini Maria Teresa E C. S.R.L., Forlimpopoli (Forli' Cesena) (IT)

( * ) Notice: Subject to any disclaimer, the term of this patent is extended or adjusted under 35 U.S.C. 154(b) by 277 days.

(21) Appl. No.: 10/570,593

(22) PCT Filed: Sep. 12, 2003

(86) PCT No.: PCT/IT03/00547

§ 371 (c)(1), (2), (4) Date: Mar. 6, 2006

(87) PCT Pub. No.: WO2005/025847

PCT Pub. Date: Mar. 24, 2005

(65) Prior Publication Data

US 2006/0272518 A1    Dec. 7, 2006

(51) Int. Cl.
*B30B 9/16* (2006.01)
(52) U.S. Cl. .................. 100/117; 100/131; 100/146
(58) Field of Classification Search ............ 100/117, 100/145, 146, 150, 337, 338, 131
See application file for complete search history.

(56) References Cited

U.S. PATENT DOCUMENTS

| 3,461,793 A | 8/1969 | Solberg |
| 4,565,124 A | 1/1986 | Stautland et al. |
| 5,743,178 A * | 4/1998 | Babbini ............ 100/127 |

FOREIGN PATENT DOCUMENTS

| EP | 0 773 100 A1 | 5/1997 |
| EP | 0 930 152 A1 | 7/1999 |
| GB | 677 794 A | 8/1952 |
| WO | WO 03 031166 A | 4/2003 |

* cited by examiner

*Primary Examiner*—Jimmy T Nguyen
(74) *Attorney, Agent, or Firm*—Browdy and Neimark, P.L.L.C.

(57) ABSTRACT

A screw press for pressing fibrous material, in particular sugar beet pulp, having a pair of adjacent counter-rotating shafts parallel axes, the shafts each having a helical structure winding in the opposite direction to the helical structure of the other shaft, a perforated filtering cage enclosing said helical structures, a loading hopper for feeding the fibrous material to the press, a discharge aperture for the exit of the pressed material, the helical structures having a helix (22, 32) and a helical element (23, 33), which has at least one perforated surface and a helical interspace with the outer surface of the shaft, the perforated surface having a length (L) along the axis of the shaft which is less than the pitch (P) of the helix so as to receive the helix of the adjacent shaft.

8 Claims, 8 Drawing Sheets

SCREW PRESS FOR SQUEEZING OUT FIBROUS MATERIAL

TECHNICAL FIELD

The present invention relates to a screw press for squeezing out fibrous material, in particular sugar beet pulp.

Presses of this type are generally used for squeezing out the liquid contained in fibrous materials, such as sugar beet pulp.

In the present invention the term "fibrous material" means any material having a ligneous (fibrous) component and a liquid component, and able to be pressed to separate the liquid component from the ligneous component.

PRIOR ART

Presses are known comprising two screws which rotate parallel to each other side by side with their helixes offset within a perforated walled filtering cage.

Presses of the aforesaid type have been known in the sector for many years.

According to the said known art the material to be pressed is fed radially from above to one end of the filtering cage through a loading hopper. The material fed in this manner is pressed by the screw, rotated by suitable drive means, and urged during pressing towards that end distant from the feed end, from which it leaves, totally or partially dewatered, through a discharge opening.

During the advancement of the material through the press, the liquid component present in the fibrous starting material traverses the perforated wall of the filtering cage. This liquid component is collected in a sump positioned outside the cage and is conveyed towards an exit opening. Generally, each screw has a pitch which decreases in the direction of advancement of the material.

Dewatering of the fibrous material is achieved by the pressure generated by forces to which the material is subjected during the pressing. This pressure, which enables the liquid component of the fibrous material to emerge through the filtering cage, is a function of the particular geometry of the press, and of the small gap present between the crest of the screw and the filtering cage.

Presses are also known in which the screws are conical with their diameter increasing from that end at which the fibrous material to be pressed is fed, to the opposite exit end. In this case, the helixes present a variable height decreasing in the same direction to safeguard the parallelism between the screws.

In presses of this type the material is also pressed in the radial direction with consequent efficiency increase compared with presses with cylindrical screws.

However these presses are known not to accomplish their purpose perfectly.

In this respect, problems often arise such as the tendency of the material to be dragged into rotation by the screws, the tendency of the material to stagnate against the walls of the screws, and the tendency of the material to undergo damage in the region present between the screw crests and the outer filtering cage.

Consequently the pressing pressure has to be increased to facilitate the removal of the liquid portion from the material during pressing.

According to a solution known in the art, to achieve an increase in the degree of pressing, in conventional presses screws have been used in certain circumstances comprising a shaft surrounded by a helical hollow box structure having a perforated surface for passage of part of the liquid portion of the fibrous material. This structure forms with the outer surface of the shaft an interspace coaxial to the shaft.

In the present invention the term "helical structure" means a hollow box structure with a portion of perforated surface extending along the direction of the shaft axis.

Presses are known in which the shafts are surrounded by a hollow conical structure having its diameter increasing from that end at which the material to be pressed enters, to the opposite exit end; the perforated surface of this structure forms with the outer surface of the shaft an interspace for collecting part of the liquid portion of the pressed material. Consequently, the height of the helix of these presses is chosen such as to decrease in the same direction to safeguard the parallelism between the shafts; this helix is known as conical.

Hence in the state of the art, presses are used having a helical structure comprising a conical perforated surface and a conical helix.

Although these improvements have achieved an increase in the degree of squeezing obtainable for a starting fibrous material, the choice of the helical structure is restricted by the press geometry.

In this respect, a press with an interspace having a conical outer surface must be associated with a conical helix, as it is not possible to have a conical interspace associated with a cylindrical helix.

There is therefore a strongly felt requirement for a double screw press having a helical filtering structure which is independent of the press geometry and which presents an interspace having a conical outer surface also associated with a cylindrical helix.

DISCLOSURE OF THE INVENTION

The object of the present invention is to provide a double screw press for pressing fibrous material, in particular sugar beet pulp, having structural and functional characteristics such as to satisfy the aforesaid requirements while at the same time obviating the stated drawbacks of the known art.

BRIEF DESCRIPTION OF THE DRAWINGS

Further characteristics and advantages of the invention will be apparent on reading the ensuing description provided by way of non-limiting example, with the aid of the figures illustrated in the accompanying drawings, in which.

MODES OF IMPLEMENTING THE INVENTION

With reference to said figures, structurally and functionally equivalent parts are indicated on the drawings by the same reference numerals. These will be described once only for descriptive brevity.

In the accompanying figures, the reference numeral 1 indicates overall a double screw press for pressing fibrous material, in particular sugar beet pulp.

In the illustrated examples, the press 1 comprises a pair of screws consisting of adjacent counter-rotating shafts 20, 30 having their respective axes X-X and X'-X' disposed parallel to each other.

About each shaft 20, 30 there is wound a box-like helical structure 21, 31, described in greater detail hereinafter, with its cross-section increasing in the direction of advancement of the material.

The shafts 20, 30 are rotatably supported at their respective ends by two robust supports 2 and 3, one of which, indicated in the figures by 2, comprises internally installed drive and transmission means, preferably electrical, not shown. Said means rotate the shafts 20, 30 at the same speed but in the opposite direction.

Around the helical structures 21, 31 there is disposed a perforated walled filtering cage 4 which follows the external profile of the structures. The cage 4 encloses as an exact fit said structures 21, 31 which are hence enveloped by the cage 4. Said cage 4 comprises at least two intersecting cylindrical portions 4' and 4" supported by a suitable central rod 5 and by two lateral rods 6, as shown in FIGS. 4, 8, 12 and 16. "The filtering cage 4 comprises on the outer part of the perforated wall a plurality of hoops 7 to oppose the pressure exerted by the fibrous material on said cage during pressing."

Said hoops 7 are provided with holes 8 traversed by suitable tie rods 9 to ensure their consistency.

At that end comprising the support 3 the filtering cage 4 is provided with a loading hopper 10 for feeding the material to be pressed.

At the opposite end of the cage 4 comprising the structure 2 containing the drive and transmission means, a discharge aperture 11 is provided for exit of the pressed fibrous material.

About the filtering cage 4 there is provided a collection sump 12 for collecting the liquid component of the pressed material. This sump 12 is supported by suitable support feet 13 which, together with the lower part of the support 2 containing the drive and transmission means, support the entire press 1.

The collection sump 12 collects in its interior the liquid component of the fibrous material fed to the press 1, this liquid component being conveyed towards an exit opening 14 by virtue of a slight slope.

According to the present invention, each box-like helical structure 21, 31 comprises a helix 22, 32 wound about the outer surface of the shaft 20, 30 and a helical element 23, 33 flanking the helix 22, 32.

Each helical element 23, 33 comprises a perforated conical surface 24, 34 and two radial side walls 25, 26 and 35, 36 to hence form with the outer surface of the shaft 20, 30 a collection interspace 27, 37 with its cross-section increasing in the direction of advancement of the material.

The perforated surface 24, 34 of the helical element extends along the axis of the shaft whereas the two side walls 25, 26 and 27, 37 are disposed substantially perpendicular to axis of the shaft 20, 30.

According to a preferred embodiment and as shown in the accompanying figures, the function of one of the side walls 25, 35 is performed by one of the sides of the helix 22, 32, whereas the other side wall 26, 36 remains free.

Each helical element 23, 33 flanking the respective helix 22, 32 presents a helical extension with a pitch equal to that of the helix 22, 32.

In practice, the collection interspace 27, 37 is helical and extends parallel to the helix.

During the pressing of the fibrous material, a part of the liquid component of the fibrous material passes through the filtering cage 4, while the other part of the liquid component passes through the perforated surface 24, 34 of the helical element 23, 33.

Consequently, that liquid component part of the pressed material which passes through the perforated surface 24, 34 undergoes within each interspace 27, 37, during rotation of the shafts 20, 30, a roto-translation towards that end of the shaft at which the pressed material also emerges. Preferably, as shown in the figures, the two helixes 22, 32 have a variable pitch which decreases progressively from the feed end 10 to the discharge aperture 11. The same applies to each helical element 23, 33 flanking the respective helix 22, 32.

The perforated surface 24, 34 of each helical element 23, 33 of the box-like structure 21, 31 has a length L along the axis of the shaft 20, 30 which is less at every point than the pitch P of the helix 22, 32.

The difference between said pitch P and the distance L between the two side walls 25, 35 and the walls 26, 36 of the helical element is equal at least to an amount sufficient to receive the helix 32, 22 of the adjacent shaft 30, 20.

Essentially, the helix 22 wound about one of the two shafts 20 is interposed between a side of the helix 32 and the free side wall 36 of the helical element 33 of the adjacent shaft 30 and vice versa.

Each helical element 23, 33 of the press 1 presents its perforated surface 24, 34 as an enveloping conical surface.

In the described examples and as shown in the accompanying figures, the perforated surface 24, 34 of the helical element 23, 33 extends conically.

In a first embodiment the press 1 comprises a pair of cylindrical shafts 20. 30, and a pair of cylindrical helixes 22, 32 (FIGS. 1-4).

In this respect, the term "cylindrical helix" means a helix the most external part of which can be enveloped by a cylindrical surface.

This configuration enables better pressing of the fibrous material compared with that attainable with presses of the known art.

In proximity to the material discharge aperture 11, the compartment formed by the pitch of the helix 22 straddling the plane comprising the axes X-X, X'-X' of the two shafts 23, 30 can be substantially occupied by the helix 32 of the adjacent shaft 30, so substantially reducing the gap present between the two helixes 22, 32.

This configuration prevents the fibrous material being able to rotate with the helix during pressing.

According to a possible variant, the helix 22, 32 is formed by a hollow box-like structure communicating with said helical interspace 27, 37 and having at least one perforated side.

According to a further embodiment of the present invention, the press 1 comprises a pair of cylindrical shafts 20, 30, and a pair of conical helixes 22, 32 formed by a hollow box-like structure communicating with the helical interspace 27, 37 and having at least one perforated side (FIGS. 5-8).

In this respect, the term "conical helix" means a helix the most external part of which can be enveloped by a conical surface.

Figure 1:
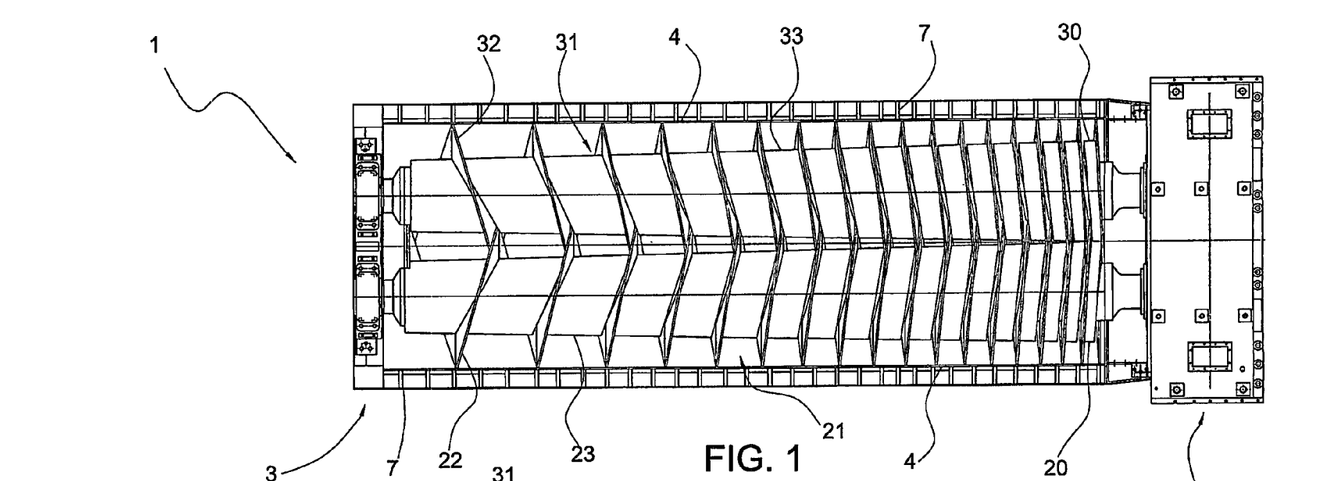
FIGS. 1 and 5 are views from above of two different embodiments of the press of the present invention.
Figure 2:
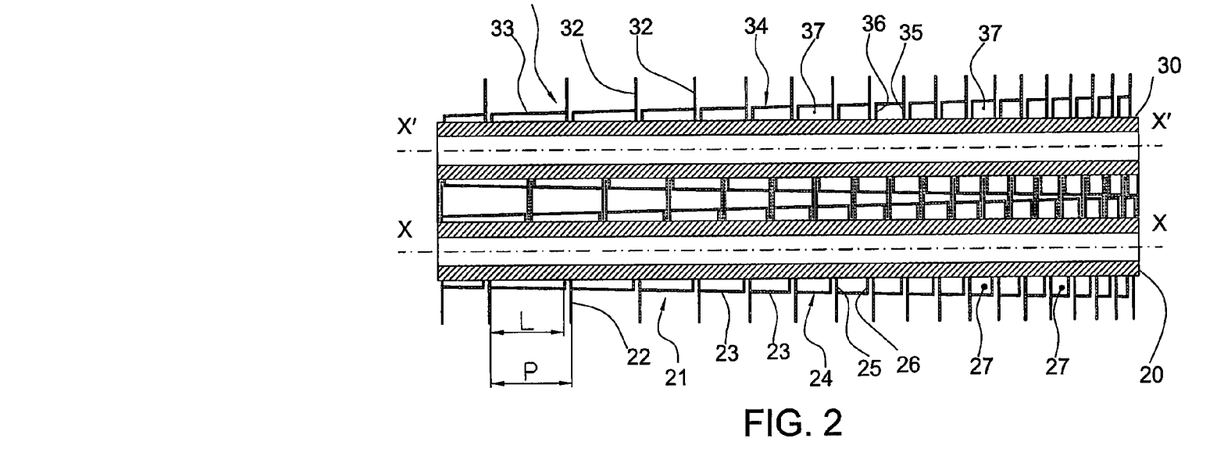
FIGS. 2 and 6 are schematic sections through a pair of cylindrical shaft screws of the presses of FIGS. 1 and 5 respectively.
Figure 3:
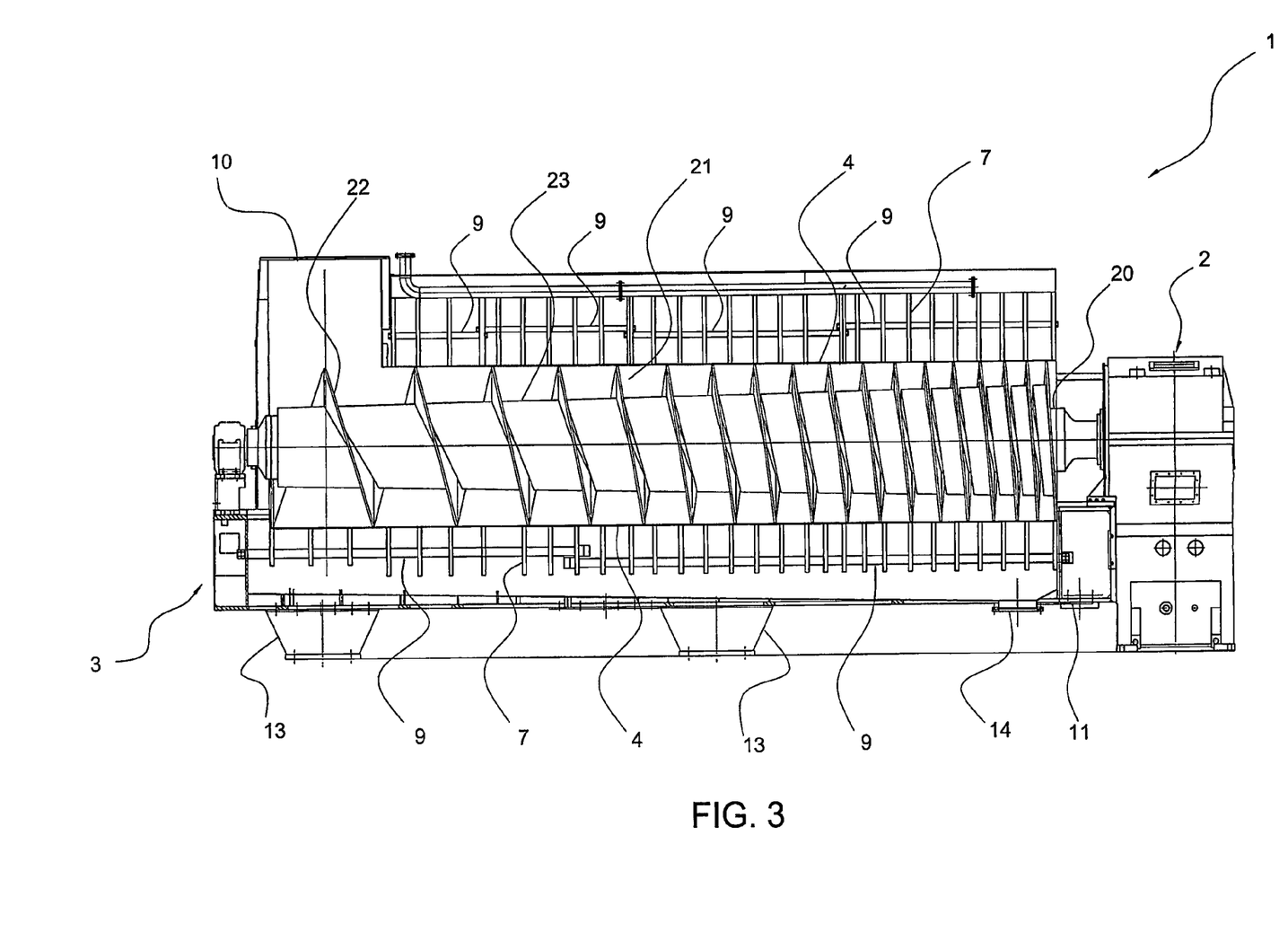
FIGS. 3 and 7 are side sections through the presses of FIGS. 1 and 5 respectively.
Figure 4:
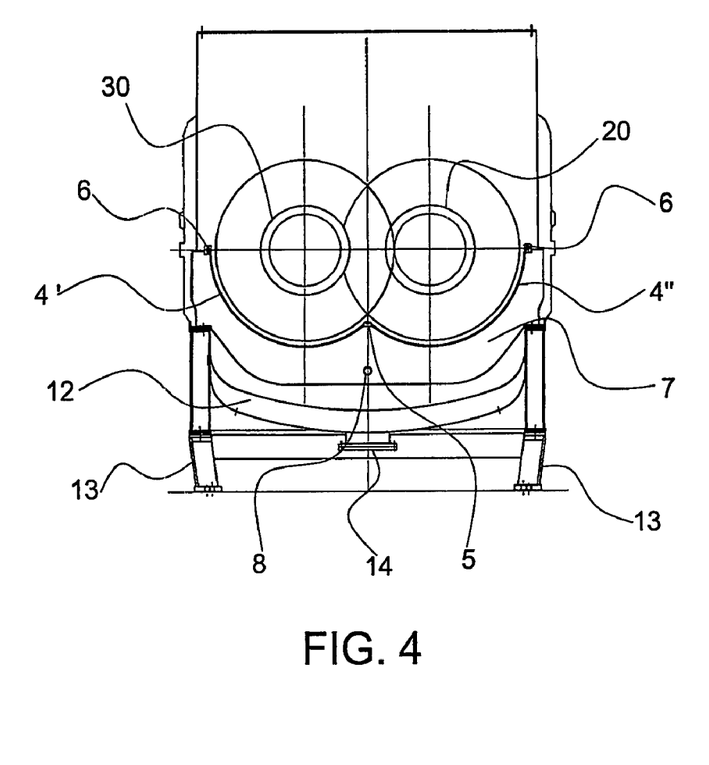
FIGS. 4 and 8 are front views of the presses of FIGS. 1 and 5 respectively.
Figure 5:
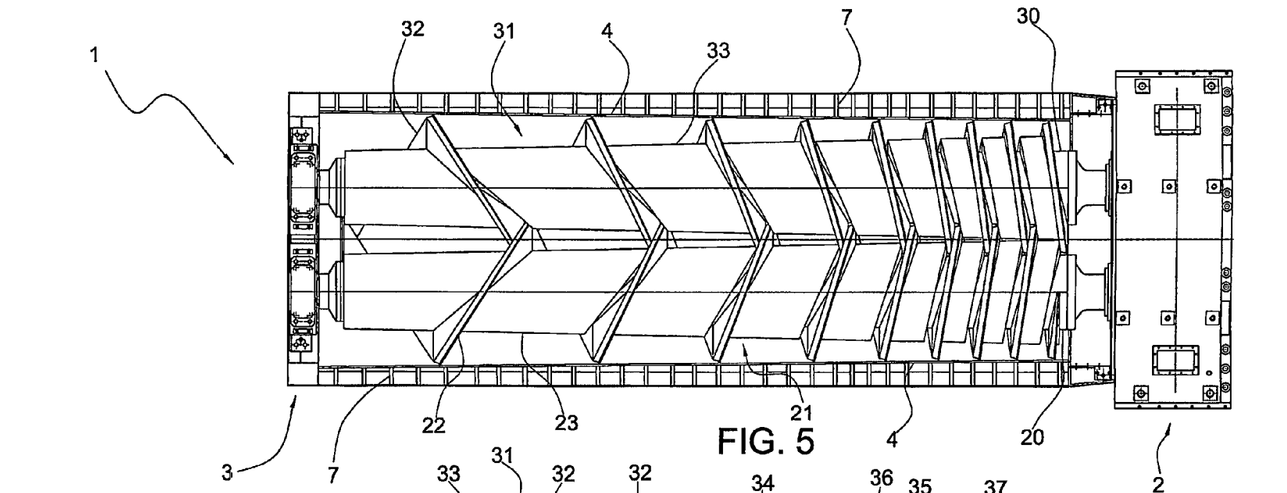
Figure 6:
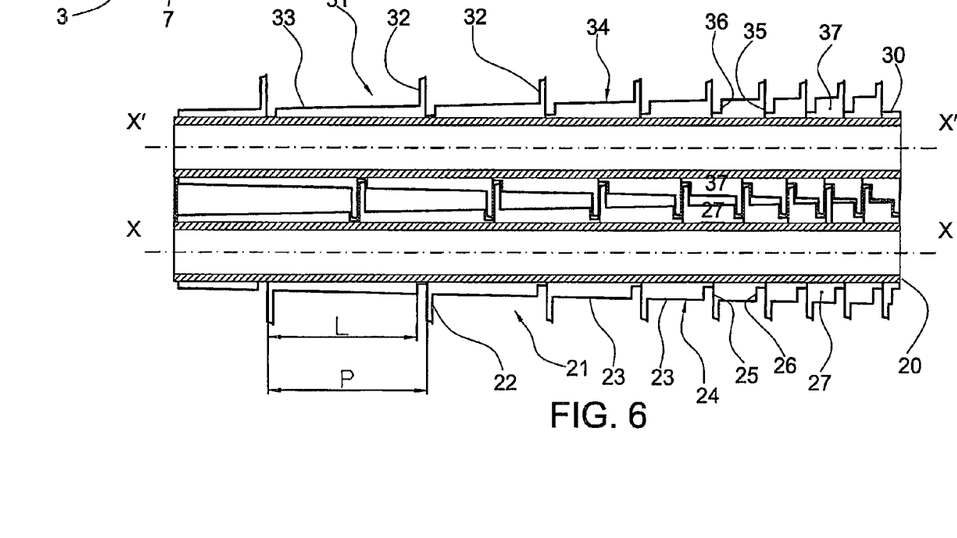
Figure 7:
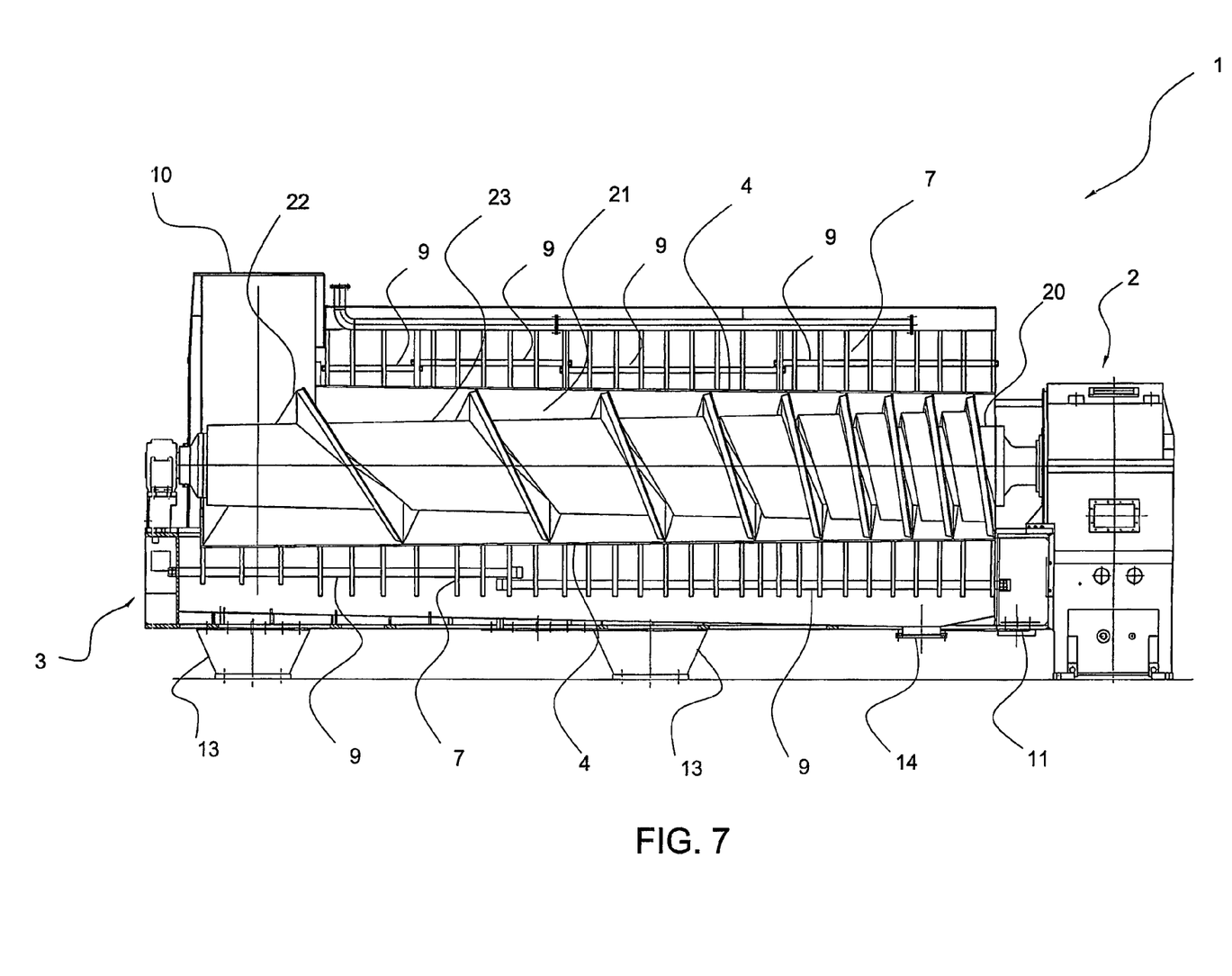
Figure 8:
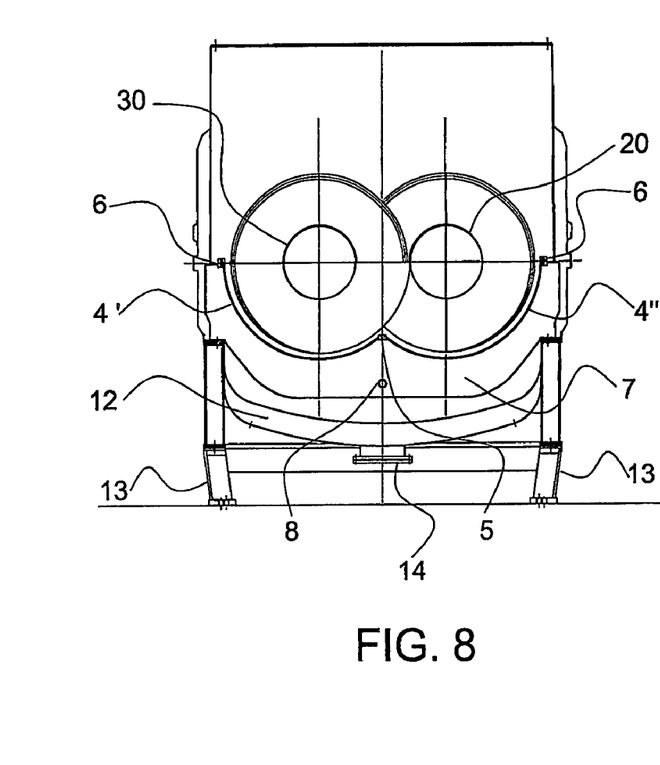
Figure 9:
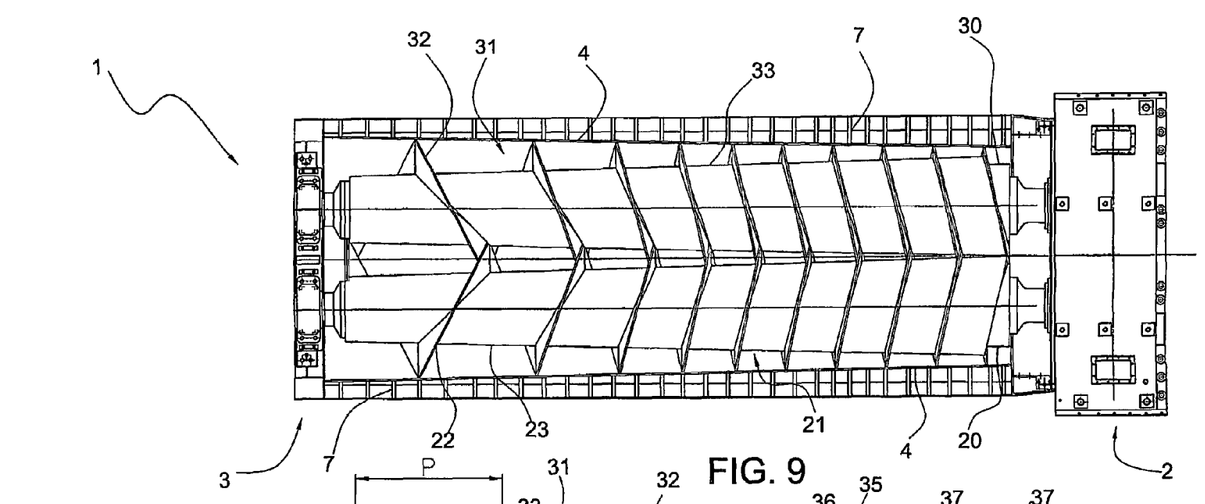
FIG. 9 is a view from above of a further embodiment of the press of the present invention.
Figure 10:
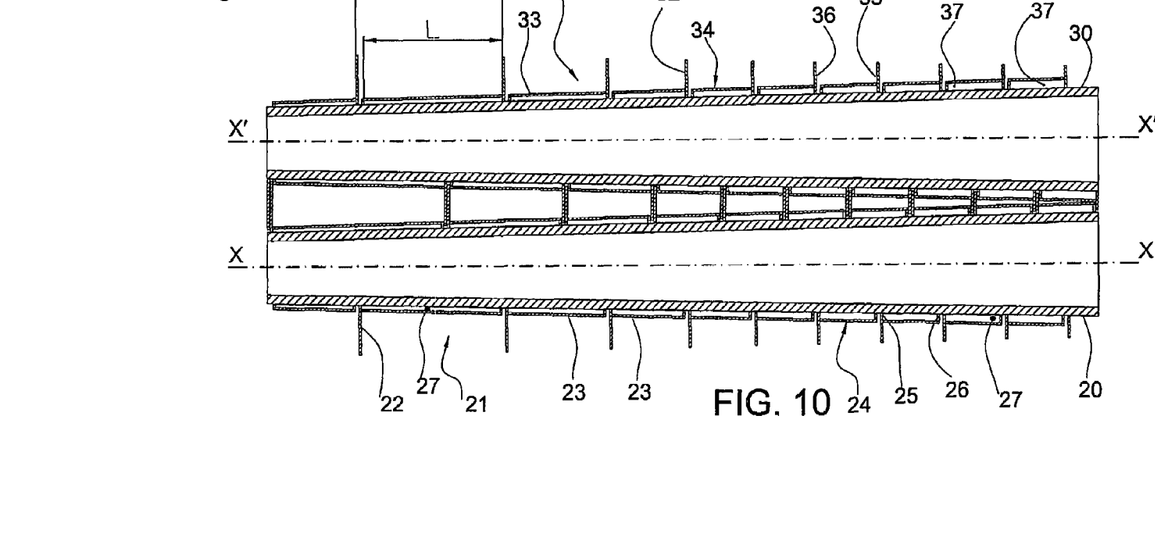
FIG. 10 is a schematic section through a pair of conical shaft screws of the press of FIG. 9.
Figure 11:
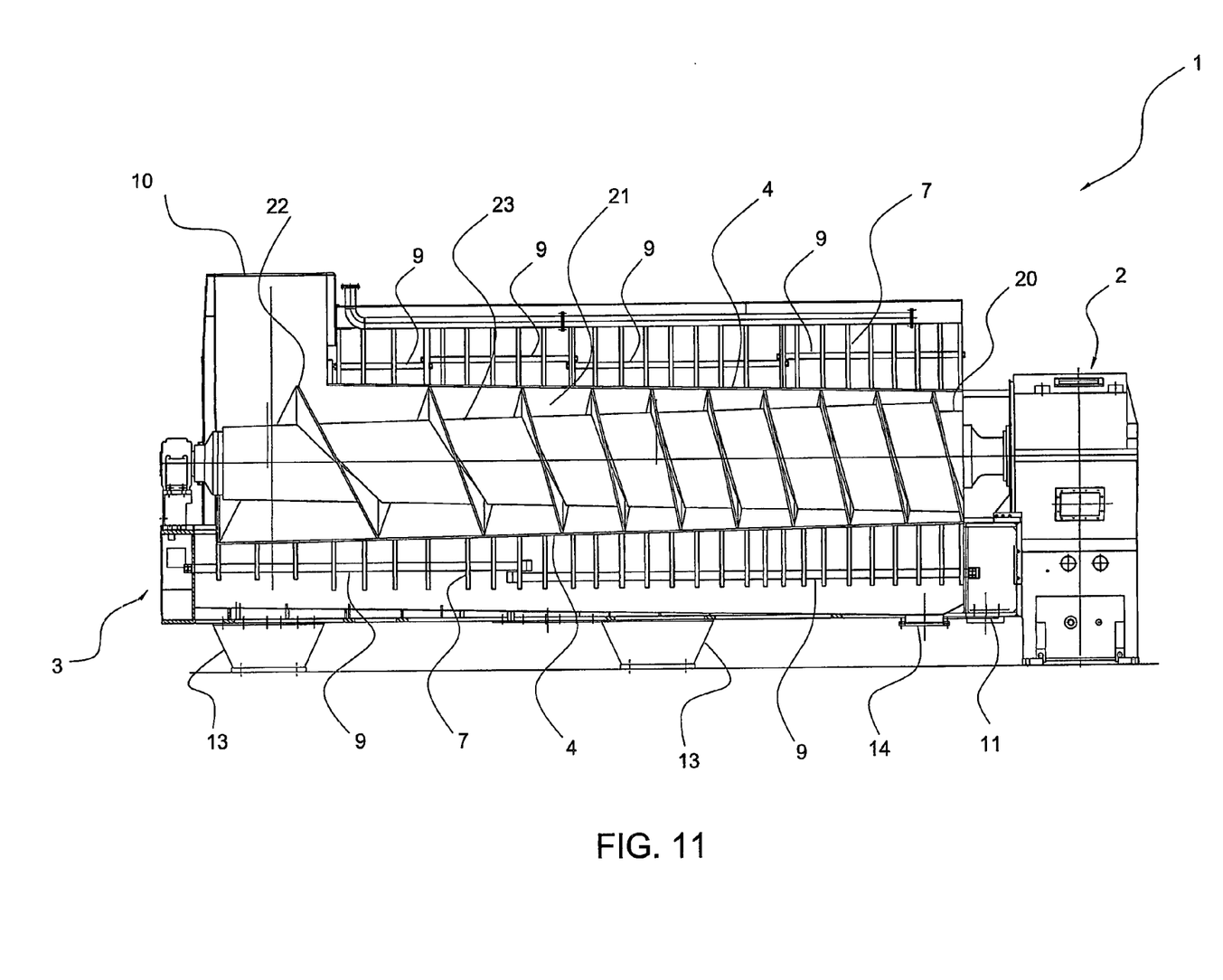
FIG. 11 is a side section through the press of FIG. 9.
Figure 12:
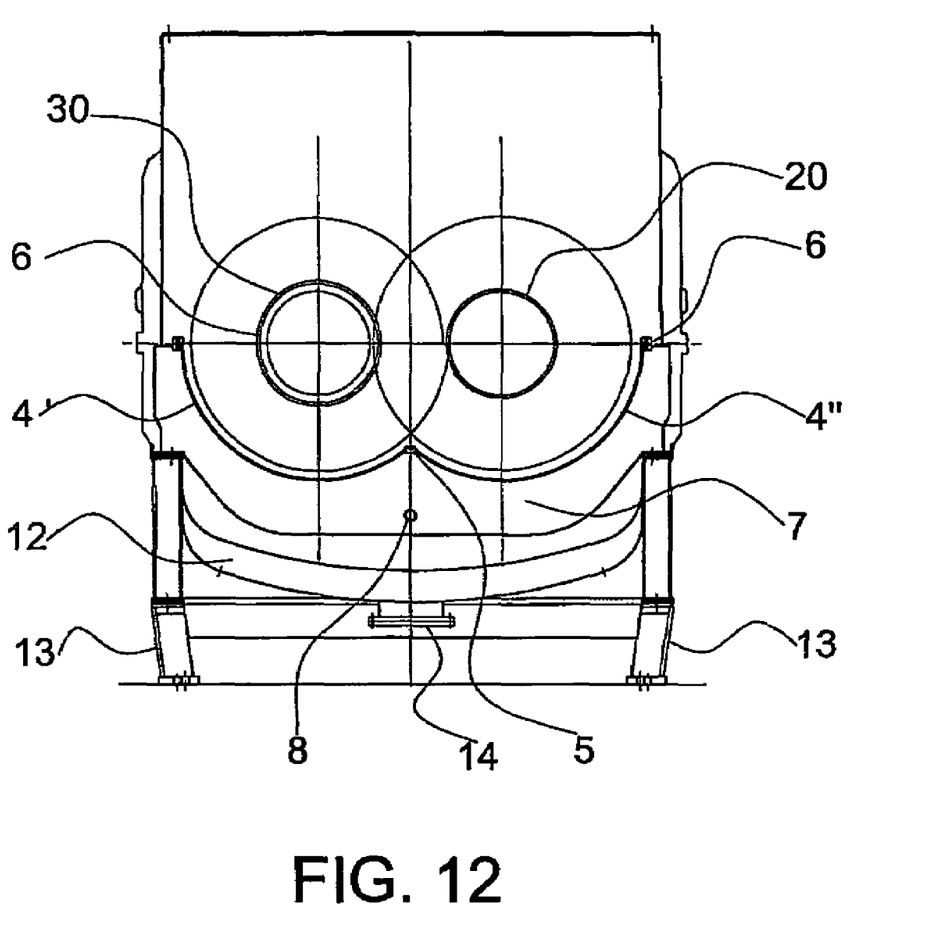
FIG. 12 is a front view of the press of FIG. 9.

In the embodiment shown in FIGS. 5-8, instead of reaching the surface of the shaft 20, 30 along a single plane, the free side wall 26, 36 of each helical element 23, 33 can be formed with a stepped profile (when viewed in section), as shown in FIG. 5.

Another possible modification to the aforedescribed embodiments can be the use of a conical instead of cylindrical shaft, as shown in the embodiment of FIGS. 9-12.

As will be apparent from the aforegoing description, the double screw press for pressing fibrous material, in particular sugar beet pulp, according to the present invention, enables the said requirements to be satisfied and the drawbacks stated in the introduction to the present description with reference to the known art to be overcome.

In this respect, by virtue of the combination of said characteristics a progressive pressing of the sugar beet pulp is obtained until a degree of controlled dewatering is achieved which is comparatively greater than the dewatering obtainable with known presses.

Moreover a virtually total absence of material damage is achieved together with a substantial reduction in the dragging rotation of the material by the press helix.

An advantage is also the provision of a conical interspace with cylindrical helixes, hence making the draining volume independent of the press geometry.

Numerous variations and modifications, all contained within the scope of protection of the invention as defined in the following claims, can be made to the aforedescribed press to satisfy contingent and specific requirements.

The invention claimed is:

1. A screw press (1) suitable for pressing fibrous material, in particular sugar beet pulp, comprising:
   a pair of adjacent counter-rotating first and second shafts (20, 30) having their axes (X-X, X'-X'), disposed parallel to each other, said shafts (20, 30) each being provided externally with a box-like helical structure (21, 31), each of said helical structures (21, 31) winding in an opposite direction with respect to the helical structure of the other shaft;
   a perforated walled filtering cage (4) enclosing said helical structures (21, 31) as an exact fit;
   a loading hopper (10) for feeding the fibrous material to the press (1);
   a discharge aperture (11) for the exit of the pressed material;
   a collection sump (12) positioned externally to said filtering cage (4) to collect the liquid component of the pressed fibrous material,
   wherein each of said box-like helical structures (21, 31) comprises a helix (22, 32), each of said helixes having a pitch (P) and a helical element (23, 33), said helical element (23, 33) forming a collection interspace (27, 37) in cooperation with the outer surface of the shaft (20, 30) and comprising at least one perforated surface (24, 34), said perforated surface (24, 34) having a length (L) along the axis (X-X, X'-X') of the shaft (20, 30) which at every point is less than the pitch (P) of the helix (22, 32) creating an open channel abutting the helix (22, 32) of the first shaft, wherein the helix (32, 22) of the adjacent second shaft (30, 20) is received in the open channel.

2. A press (1) as claimed in claim 1, wherein said shaft (20, 30) has a cylindrical outer surface.

3. A press (1) as claimed in claim 1, wherein said shaft (20, 30) has a conical outer surface.

4. A press (1) as claimed in claim 1, wherein said perforated surface (24, 34) is enveloped by a conical surface.

5. A press (1) as claimed in claim 1, wherein said helix (22, 32) is enveloped externally by a cylindrical surface.

6. A press (1) as claimed in claim 1, wherein said helix (22, 32) is enveloped externally by a conical surface.

7. A press (1) as claimed in claim 1, wherein said helix (22, 32) is formed by a hollow box-like structure communicating with said interspace (27, 37) and presents at least one perforated side.

8. A press (1) as claimed in claim 1, wherein said helix (22, 32) presents a pitch decreasing in a direction of advancement of the material during pressing.

* * * * *